No. 687,064. Patented Nov. 19, 1901.
W. W. PUMYEA.
CLOTHES LINE ATTACHMENT.
(Application filed July 22, 1901.)
(No Model.)
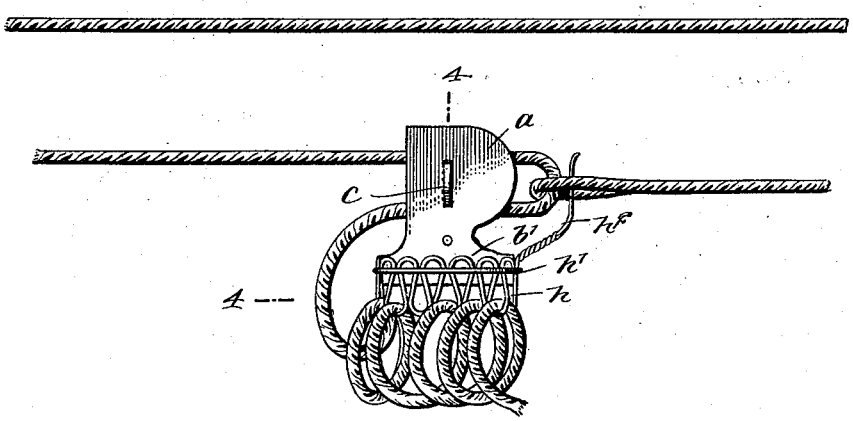
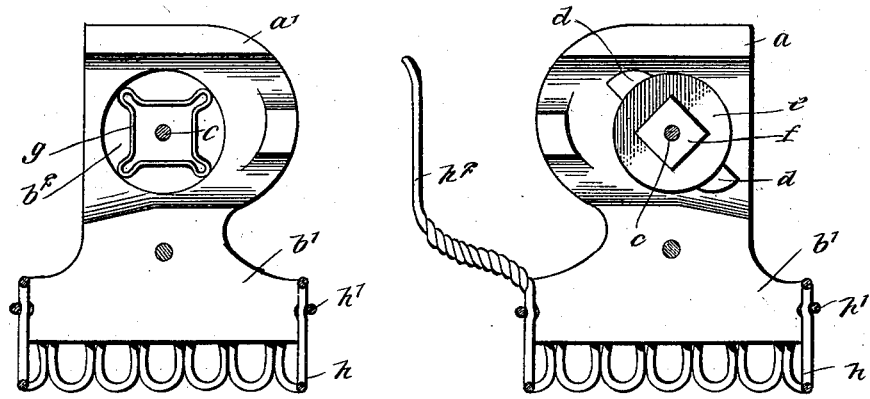
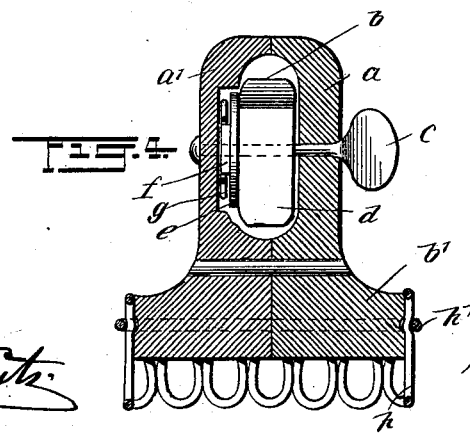
WITNESSES:
INVENTOR
William W. Pumyea
BY
ATTORNEYS

UNITED STATES PATENT OFFICE.

WILLIAM WILLIAMSON PUMYEA, OF JERSEY CITY, NEW JERSEY.

CLOTHES-LINE ATTACHMENT.

SPECIFICATION forming part of Letters Patent No. 687,064, dated November 19, 1901.

Application filed July 22, 1901. Serial No. 69,266. (No model.)

*To all whom it may concern:*

Be it known that I, WILLIAM WILLIAMSON PUMYEA, a citizen of the United States, and a resident of Jersey City, in the county of Hudson and State of New Jersey, have invented a new and Improved Clothes-Line Attachment, of which the following is a full, clear, and exact description.

This invention is applied to a clothes-line of that class in which a line is run over two blocks and connected at its ends, so as to form an endless line which may be drawn one way or the other. These lines are generally used in cities, one of the blocks being fastened to a building adjacent to a window and the other block being fastened on a distant object. The purpose of the invention is to provide means for conveniently holding together the ends of the line, so that the line may be made taut or slack at will.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a view illustrating the use of the invention. Figs. 2 and 3 are face views of the two sections of the device, showing them separated; and Fig. 4 is a section on the line 4 4 of Fig. 1.

The body of the device is preferably constructed in two sections, as shown, the sections being designated $a$ and $a'$, respectively. When fastened together in proper relation, the body comprises a chamber $b$ in the upper part (see Fig. 4) and a circular base $b'$. Within the body and extending through the chamber $b$ is a thumb-pin $c$, to which is fastened a dog $d$, this dog lying within the chamber $b$ and acting to jam the line against opposite walls of the same, as will be hereinafter fully explained. At one side of the dog the pin $c$ carries a disk $e$, alongside of which lies a square projection $f$, fitting in a spring-frame $g$, which lies in a concavity $b^2$ in the chamber $b$. The square projection $f$ engages with the frame $g$ and by the spring action of the frame $g$ on the projection $f$ the thumb-pin $c$ is held from idle movement, although the pin with the dog attached may be readily turned by overcoming the pressure of the spring-frame $g$. Around the base $b'$ of the body is arranged an annulus of looped wire $h$, which is securely fastened in place by any approved means—for example, by the binding-strap $h'$. From this annulus $h$ projects an arm $h^2$. The device thus constructed is used by passing one end of a line through the chamber $b$, first above the dog $d$ and thence back under the dog. The bight thus formed in the end which is engaged with the dog receives au eye formed on the other end of the rope. The arm $h^2$ projects into this eye. (See Fig. 1.) Now it is clear that by drawing on the first end of the rope in one direction it may be moved freely through the body past the dog and the rope properly tightened. It will be impossible to relax this strain on the rope except by the manipulation of the thumb-pin $c$ and the consequent movement of the latch or dog $d$. The loose end of the rope may then be engaged with the loops of the annular rack $h$. The arm $h^2$ tends to prevent the displacement of the attachment with respect to the eye on the clothes-line. Now by means of this device the clothes-line may always be kept at the proper tension during the time when it is in use, and when it is out of use it may be readily slackened up so as to avoid straining the line and the supporting parts should the line in becoming wet contract so as to render itself unduly taut.

Various changes in the form, proportions, and minor details of my invention may be resorted to without departing from the spirit and scope of my invention. Hence I consider myself entitled to all such variations as may lie within the scope of my claims.

Having thus described my invention, I claim as new and desire to secure by Letters Patent—

1. The combination with a clothes-line, of a body portion with which one end of the line is engaged to form a bight, said bight being received in an eye in the other end of the line, and a dog in the body for engaging the line, adjustably to hold it.

2. The combination of a body having a chamber therein, and a dog pivotally mounted in the chamber, the dog having its ends arranged to work in coaction with opposite walls of said chamber.

3. The combination of a body, a dog carried thereby to engage and hold a line and an arm on the body, and adapted to engage a part of the line to prevent independent movement of the body.

4. The combination with a clothes-line, of a body portion with which one end of the line is engaged to form a bight, said bight being connected with the other end of the line, and a dog in the body for engaging the line adjustably to hold it.

5. The combination of a body, a dog working with the body for the purpose specified, said dog having an angular part thereon, and an angular spring-frame inclosing said angular part of the dog, to prevent idle movement thereof.

In testimony whereof I have signed my name to this specification in the presence of two subscribing witnesses.

WILLIAM WILLIAMSON PUMYEA.

Witnesses:
GEORGE B. SKINNER,
WILLIAM V. A. POE.